(12) United States Patent
Watanabe et al.

(10) Patent No.: US 8,578,073 B2
(45) Date of Patent: *Nov. 5, 2013

(54) STORAGE SYSTEM AND CONTROL METHOD OF STORAGE SYSTEM

(75) Inventors: Yutaka Watanabe, Odawara (JP); Tamura Keishi, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 19 days.

This patent is subject to a terminal disclaimer.

(21) Appl. No.: 13/306,627

(22) Filed: Nov. 29, 2011

(65) Prior Publication Data

US 2012/0072623 A1 Mar. 22, 2012

Related U.S. Application Data

(63) Continuation of application No. 12/155,718, filed on Jun. 9, 2008, now Pat. No. 8,086,768.

(30) Foreign Application Priority Data

Mar. 31, 2008 (JP) .................................. 2008-093972

(51) Int. Cl.
  *G06F 3/00* (2006.01)
  *G06F 5/00* (2006.01)
(52) U.S. Cl.
  USPC .................................. 710/38; 710/14; 710/36
(58) Field of Classification Search
  None
  See application file for complete search history.

(56) References Cited

U.S. PATENT DOCUMENTS

| | | | |
|---|---|---|---|
| 5,408,646 A * | 4/1995 | Olnowich et al. | 714/4.1 |
| 6,112,257 A | 8/2000 | Mason, Jr. et al. | |
| 6,145,028 A | 11/2000 | Shank et al. | |
| 6,289,019 B1 * | 9/2001 | Dieudonne | 370/395.3 |
| 8,086,768 B2 * | 12/2011 | Watanabe et al. | 710/38 |
| 2002/0114332 A1 * | 8/2002 | Apostolopoulos et al. | 370/392 |
| 2005/0044287 A1 | 2/2005 | Nishizono et al. | |
| 2005/0099983 A1 * | 5/2005 | Nakamura et al. | 370/338 |
| 2006/0026346 A1 | 2/2006 | Kadoiri et al. | |
| 2006/0143332 A1 | 6/2006 | Yagi et al. | |
| 2006/0230189 A1 | 10/2006 | Sahara et al. | |
| 2007/0124535 A1 * | 5/2007 | Kashima et al. | 711/114 |
| 2007/0234113 A1 | 10/2007 | Komatsu et al. | |
| 2008/0301333 A1 * | 12/2008 | Butler et al. | 710/38 |

FOREIGN PATENT DOCUMENTS

| | | |
|---|---|---|
| EP | 1674983 A1 | 6/2005 |
| EP | 1768320 A2 | 3/2007 |
| JP | 2006-178811 | 12/2004 |
| JP | 200510956 A | 1/2005 |
| JP | 2005070994 A | 3/2005 |
| JP | 2007-265243 | 3/2006 |
| JP | 2006128955 A | 6/2006 |
| JP | 2006178811 A | 7/2006 |
| JP | 2007148812 A | 6/2007 |

* cited by examiner

*Primary Examiner* — Kris Rhu
(74) *Attorney, Agent, or Firm* — Hitachi America, Ltd.

(57) ABSTRACT

The storage system includes a first storage subsystem having a first logical volume to be accessed by a host computer, and a second storage subsystem connected to the first storage subsystem and having a second logical volume to be mapped to the first logical volume. The first storage subsystem includes a memory having definition information for defining a plurality of logical paths that transfer, to the second logical volume, I/O from the host computer to the first logical volume, and a transfer mode of the I/O to the plurality of logical paths. At least two or more logical paths among the plurality of logical paths are defined as active, and the controller transfers the I/O to the at least two or more logical paths set as active.

12 Claims, 11 Drawing Sheets

FIG.3

EXTERNAL DEVICE INFORMATION TABLE

| VDEV# | VALID PATH BITMAP | EXTERNAL-SIDE PATH MODE | CONFIGURED PATH MODE | DEVICE IDENTIFYING INFORMATION | CAPACITY (KB) | DEVICE TYPE | ... | EXTERNALLY CONNECTED PATH INFORMATION UNIT | | | | | | | | |
|---|---|---|---|---|---|---|---|---|---|---|---|---|---|---|---|---|
| | | | | | | | | PATH # | EXTERNAL PORT # | WWN | LUN | ... | EXTERNAL-SIDE A/P | CONFIGURATION A/P | STATUS | PRIORITY |
| 1 | 11110000 | APLB | APLB | AABBCCDDEE | C1 | DISK | ... | P1 | 1 | A | 1 | ... | Active | Active | Normal | 1 |
| | | | | | | | | P2 | 2 | A' | 2 | ... | Active | Active | Normal | 2 |
| | | | | | | | | P3 | 3 | B | 3 | ... | Passive | Passive | Passive | 3 |
| | | | | | | | | P4 | 4 | B' | 4 | ... | Passive | Passive | Passive | 4 |
| | | | | | | | | P5 | - | - | - | - | - | - | - | - |
| | | | | | | | | | | | | | | | | |
| | | | | | | | | P8 | - | - | - | - | - | - | - | - |
| 2 | 11001100 | SINGLE PATH | SINGLE PATH | EEDDCCBBAA | C2 | TAPE | ... | ... | | | | | | | | |
| ... | ... | ... | ... | ... | ... | ... | ... | ... | | | | | | | | |

| ExG | LDEV | VOLUME IDENTIFIER 1 | ... | CAPACITY (BLOCKS) | ... | PATH MODE | ... | EXTERNAL VOL STATUS |
|---|---|---|---|---|---|---|---|---|
| E1-1 | 00:03:21 | 0FE00 | | | | | | NORMAL |
| E1-2 | 00:03:22 | 0FE01 | | 819840 | | Multi | | NORMAL |
| E1-3 | 00:03:23 | 0FE02 | | 819840 | | Multi | | NORMAL |
| E1-4 | 00:03:24 | 0FE03 | | 819840 | | Multi | | NORMAL |
| E1-5 | 00:03:25 | 0FE04 | | 819840 | | | | |

MAPPING PATH INFORMATION

| PRIORITY | PORT | WWN | LUN | STATUS |
|---|---|---|---|---|
| 1 | CL1-A | 0011223344556677 | 0000 | Cannot detect port |
| 2 | CL5-A | 0011223344556677 | 0000 | NORMAL |

SUBSYSTEM VENDOR A
Path group 0

DISPLAY FILTER   STATUS: VALID

PREVIEW   APPLY   CANCEL   CLOSE

OPERATIONAL STATUS: NO OPERATION

Volume Operation | Path Operation | Port Operation

STORAGE SYSTEM AND CONTROL METHOD OF STORAGE SYSTEM

CROSS REFERENCES

This application is a Continuation of nonprovisional U.S. application Ser. No. 12/155,718 filed on Jun. 9, 2008, now U.S. Pat. No. 8,086,768, which relates to and claims priority from Japanese Patent Application No. 2008-093972, filed on Mar. 31, 2008, the entire disclosure of which is incorporated herein by reference.

BACKGROUND

The present invention generally relates to a storage system, and in particular relates to a storage system in which a second storage subsystem is externally connected to a first storage subsystem, and a control method of such a storage system.

In order to deal with a system environment that undergoes sudden changes due to increase in the data amount or data traffic, there is a compound storage system. in which a storage subsystem is externally connected to an existing storage subsystem.

This compound storage system, as described in Japanese Patent Laid-Open Publication No. 2006-178811 (Patent Document 1), virtualizes a volume of a first storage subsystem, associates a storage area of a second storage subsystem to the virtualized volume, and transfers the I/O from a host computer to the virtualized volume of the first storage subsystem to the second storage subsystem to store data in the storage area thereof. The storage capacity of the first storage subsystem to be used by the host system can thereby be expanded.

As a control method of a plurality of logical paths defined between the first storage subsystem and the second storage subsystem, Patent Document 1 describes the first storage subsystem using a primary path among the plurality of paths to issue an I/O to the volume of the second storage subsystem.

When a failure occurs in the primary path, the I/O control right, which is the authority for passing the I/O through, is switched from the primary path to other paths in descending order of priority. For reference's sake, the method of transferring I/O via a single path as described above is referred to as a single path mode.

Meanwhile, a round robin method where the first storage subsystem distributively issues the I/O to a plurality of paths between the first storage subsystem and the second storage subsystem is known as a multi-path mode.

Japanese Patent Laid-Open Publication No. 2007-265243 relates to a computer system comprising a host computer and a storage system, and describes technology of switching a logical path connecting the host computer and the storage system.

SUMMARY

If the second storage subsystem is adopting the active path/passive path method as the control method of a logical path defined regarding the I/O transfer from the virtual volume of the first storage subsystem to the external volume of the second storage subsystem, and the foregoing multi-path mode is applied to the I/O transfer between the storage subsystems, the I/O will be simultaneously issued to the active path having an I/O control right and the passive path which has no I/O control right. Consequently, the switching of the I/O control right will occur frequently, and there is a problem in that the response to the I/O issued to the external volume will deteriorate.

Thus, with a conventional system, transfer of the I/O between the first storage subsystem and the second storage subsystem was fixed to the foregoing single path mode. Nevertheless, with the control method based on the single path mode, the second storage subsystem is not able to sufficiently exhibit the response performance to the I/O sent from the first storage subsystem.

Thus, an object of the present invention is to provide a storage system and its control method capable of improving the response performance of a second storage subsystem to an I/O issued in a storage system where a second storage subsystem is externally connected to a first storage subsystem.

Another object of the present invention is to provide a storage system and its control method capable of improving the response performance of a second storage subsystem to an I/O issued from a first storage subsystem to an external volume even when a plurality of logical paths concerning the I/O transfer from the second storage subsystem to the external volume mapped to the first storage subsystem are defined as active paths.

In order to achieve the foregoing objects, the present invention provides a storage system in which a second storage subsystem is externally connected to a first storage subsystem, including a plurality of logical paths respectively defined as active as logical paths to an external volume of the second storage subsystem. The first storage subsystem issues the I/O to these plurality of logical paths set as active in round robin.

According to the present invention, it is possible to improve the response of the I/O issued to an external volume of a second storage subsystem in a storage system where a second storage subsystem is externally connected to a first storage subsystem.

DESCRIPTION OF DRAWINGS

FIG. 3 is a management table registering information of a logical path to be formed from the first storage subsystem to the external volume of the second storage subsystem, a mode for transferring the I/O to the path, and information of the external logical volume;

FIG. 10 is an example of a management screen to be provided from the management apparatus to the user; and FIG. 11 is another example of the management screen to be provided from the management apparatus to the user.

DETAILED DESCRIPTION

Figure 1:
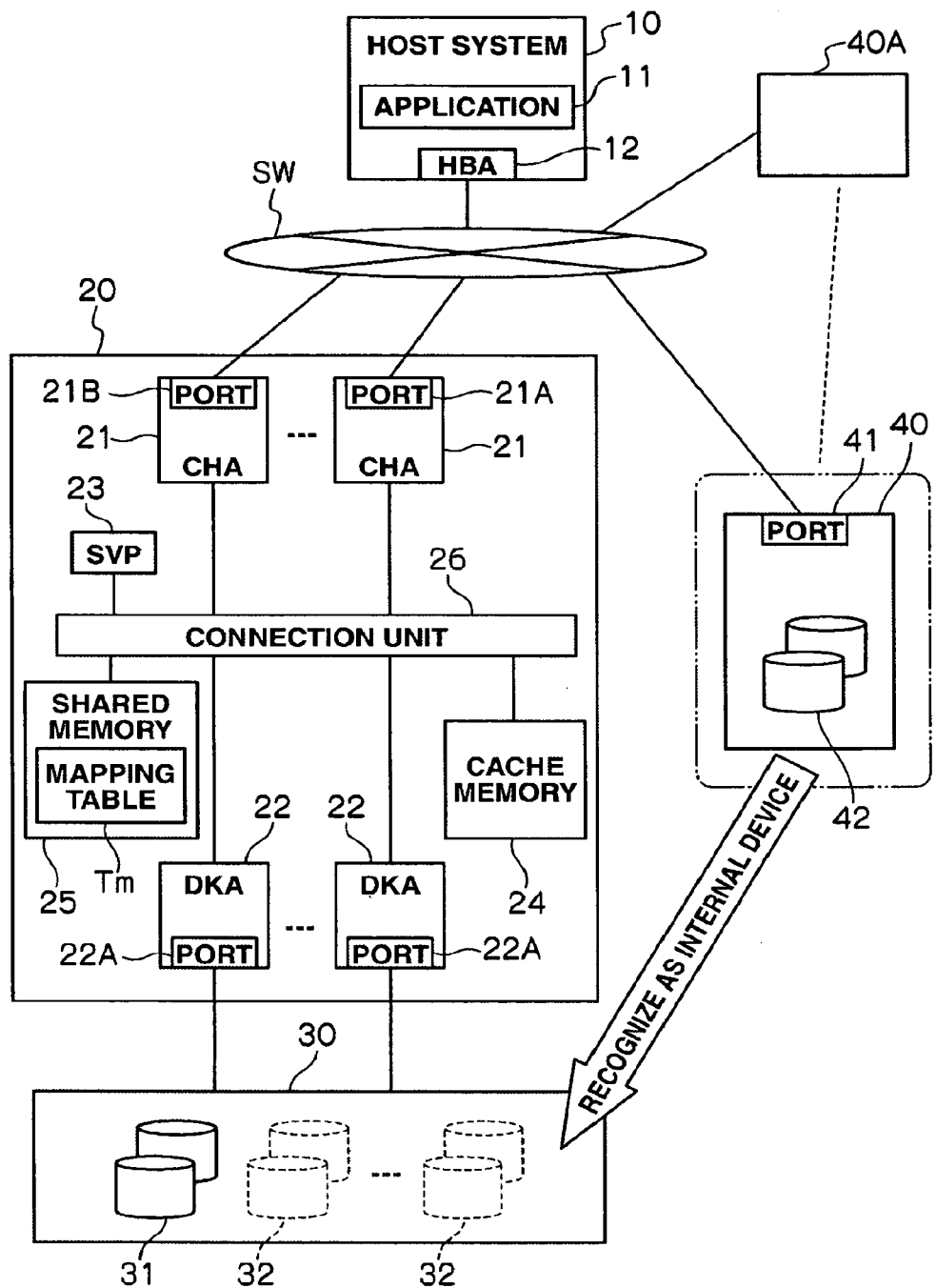
FIG. 1 is a hardware block diagram showing an embodiment of a storage system according to the present invention.

Embodiments for working the present invention are now explained with reference to the attached drawings. FIG. 1 is a block diagram showing the configuration of a storage system according to an embodiment of the present invention. A host system 10 as an upper-level system is a computer apparatus comprising information processing resources such as a CPU (Central Processing Unit) and a memory, and, for instance, is configured from a personal computer, a workstation, a mainframe or the like.

The host system 10 is provided with an application program 11 such as database software that uses a storage area provided by a first storage subsystem 20, and an adapter 12 for accessing the first storage subsystem 20 via a communication network CN1.

The host system 10 is connected to the first storage subsystem 20 via the communication network CN1 comprising a switch circuit SW. As the communication network CN1, for instance, a LAN, a SAN, Internet, a dedicated line, a public line or the like may be used depending on the usage. Data communication via the LAN is performed according to a TCP/IP (Transmission Control Protocol/Internet Protocol) protocol or the like.

If the host system 10 is to be connected to the first storage subsystem 20 via the LAN, the host system 10 designates a file name and requests the data I/O in file units.

Meanwhile, if the host system 10 is to be connected to the first storage subsystem 20 via the SAN, the host system 10 requests the data I/O in block units, which are the data management units of the storage area provided by a plurality of disk storage apparatuses (disk drives) according to a fibre channel protocol. If the communication network CN1 is a LAN, the adapter 12 is a LAN-compatible network card or the like. If the communication network CN1 is a SAN, the adapter 12 is a host bus adapter or the like.

The switch circuit SW comprises a router or a switchboard connected to a communication network. The switch circuit SW connects a target port 41 of the second storage subsystem 40 to the external port 21A or 21B of the first storage subsystem 20. A network address is set to the port and the switch circuit. Reference numeral 40A is another chassis classified as a second storage subsystem.

The first storage subsystem 20, as described later, is used for providing the storage resources of the second storage subsystem 40 as its own logical volume (Logical Unit) to the host system 10.

The first storage subsystem 20 can be broadly classified into a controller unit and a storage apparatus unit, and the controller unit comprises, for instance, a plurality of channel adapters (CHA) 21, a plurality of disk adapters (DKA) 22, a service processor (SVP) 23, a cache memory 24, a shared memory 25, and a connection unit 26.

The channel adapter (CHA) 21 performs data communication with the host system 10. The other channel adapters 21 are used for performing data communication with the logical volume of the second storage subsystem 40 via the external port 21A of the first storage subsystem and the target port 41 of the second storage subsystem.

Each channel adapter 21 is configured as a micro computer system comprising a microprocessor, a memory and the like, and interprets and executes the various commands received from the host system 10.

Since each channel adapter 21 is allocated with a network address (i.e, IP address or WWN) for identifying the respective channel adapters 21, each channel adapter 21 is able to independently function as a NAS (Network Attached Storage).

If there are a plurality of host systems 10, each channel adapter 21 is provided for each host system, and configured so that it is able to independently receive requests from the respective host systems 10. The host system and the channel adapter may also be connected directly without going through a network.

The disk adapter (DKA) 22 is used for sending and receiving data to and from the memory devices 31, 32 of the storage apparatus 30. Each disk adapter 22 comprises a communication port 22A for connecting to the memory devices 31, 32.

The disk adapter 22 is configured as a micro computer system comprising a microprocessor, a memory, and the like. The disk adapter 22 writes the data that the channel adapter 21 received from the host system 10 into a prescribed address of a memory device 31, 32 based on a request from the host system 10, and reads the data from a prescribed address of a prescribed memory device 31, 32 and sends such data to the host system 10 based on a request from the host system 10.

When performing data I/O with the memory devices 31, 32, each disk adapter 22 converts the logical address into a physical address. Each disk adapter 22 performs data access to the RAID configuration if the memory devices 31, 32 are managed according to RAID.

The service processor (SVP) 23 is used for controlling the operation of the overall apparatus. For example, a management client (not shown) is connected to the SVP 23. The SVP 23 is able to monitor the occurrence of a failure in the apparatus and display such failure on the management client, and command block processing or the like of storage disks according to a command from the management client. The management client is configured, for instance, by a management program being loaded in a JAVA (registered trademark) applet.

The cache memory 24 is used for temporarily storing data received from the host system 10 and data read from the memory devices 31, 32.

The shared memory 25 stores control information and the like to be used in the operation of the first storage subsystem. In addition to a work area being set therein, the shared memory 25 also stores a table for managing information of the external storage subsystem.

The cache memory 130 and the shared memory 140 may be respectively configured as separate memories, or a partial storage area of the same memory may be used as a cache area and the remaining storage area may be used as a control area. Incidentally, one or more memory devices 31, 32 may be used as cache disks.

The connection unit 26 mutually connects the respective channel adapters 21, the respective disk adapters 22, the SVP 23, the cache memory 24, and the shared memory 25. The connection unit 26 can be configured as a high-speed bus such as an ultrafast crossbar switch that performs data transfer by way of high-speed switching.

The storage apparatus 30 comprises a plurality of memory devices 31. As the memory devices 31, for instance, devices such as hard disks, flexible disks, magnetic tapes, semiconductor memories, and optical disks may be used.

In addition, different types of disks such as FC (Fibre Channel) disks and SATA (Serial AT Attachment) disks may also coexist in the storage apparatus 30.

The memory devices 32 shown with dotted lines in the storage apparatus 30 illustrate a status where the memory devices 42 of the second storage subsystem 40 are imported to the first storage subsystem 20. In other words, the storage area of the memory device 42 that exists externally when viewed from the first storage subsystem 20 is made to be recognizable by the host system as though it is an internal memory device of the first storage subsystem 20 so that the host system 10 is able to use the storage resources of the external memory device 42.

This is realized by mapping the logical volume of the second storage subsystem 40 to a virtual logical volume which is an intermediate logical storage area in the first storage subsystem 20.

The storage space of the cache memory 24 is used to create a virtual logical volume. The virtual logical volume formed in the first storage subsystem 20 is recognized by the host system 10 together with the real logical volume in the first storage subsystem 20.

The second storage subsystem 40 comprises a communication port (target port) 41 and a memory device 42. In addition, the second storage subsystem 40 may also comprise a channel adapter, a disk adapter, and so on.

The second storage subsystem 40 is connected to the first storage subsystem 20 via the switch circuit SW, and the memory device 42 of the second storage subsystem 40 is handled as the internal memory device of the first storage subsystem 20. The switch circuit SW can be connected to a plurality of external storage subsystems 40A.

Figure 2:
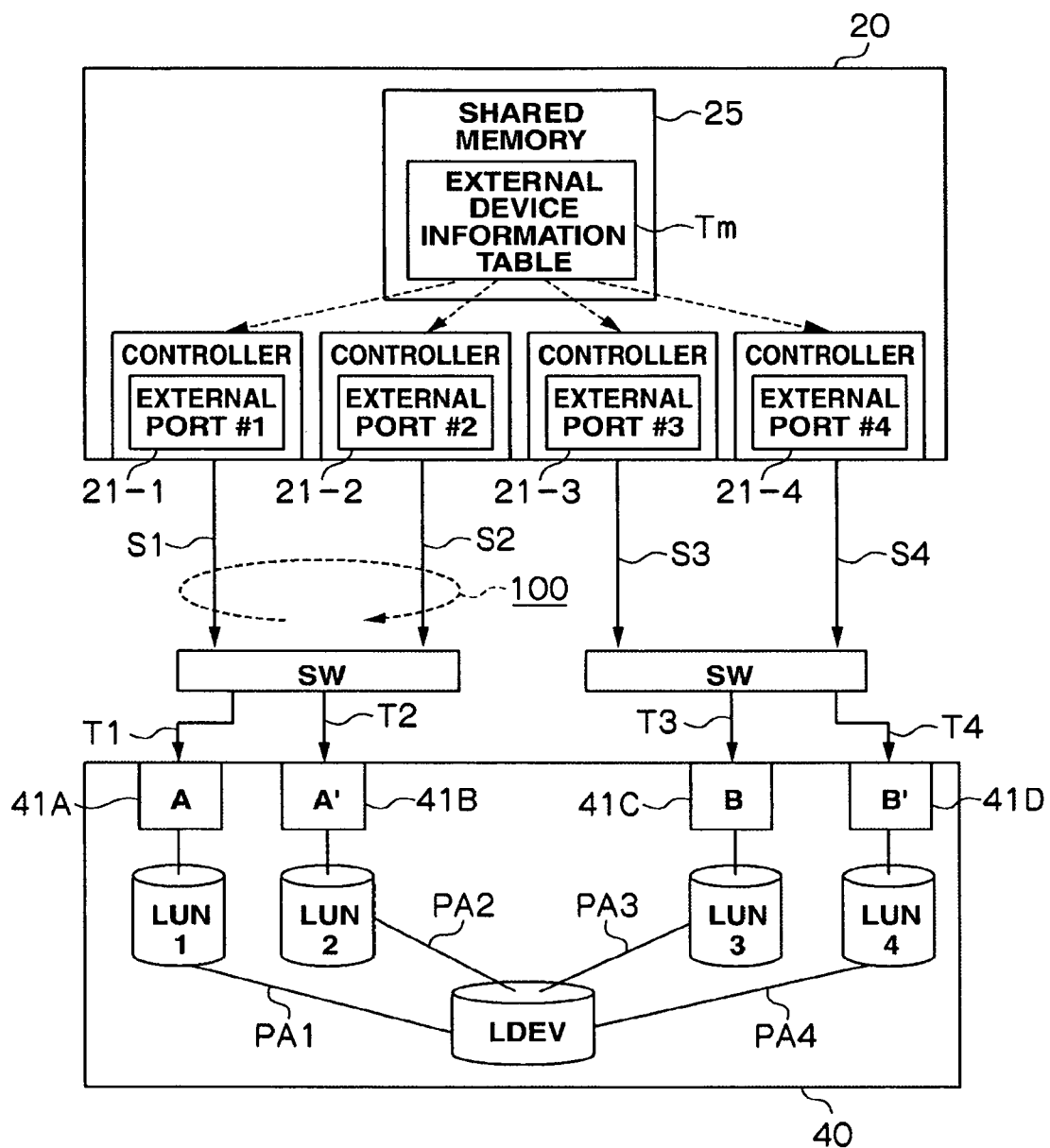
FIG. 2 is a block diagram showing the topology of a path from a first storage subsystem to an external volume of a second storage subsystem.

The system for controlling the issuance and transfer of I/O from the first storage subsystem 20 to the second storage subsystem 40 is now explained. FIG. 2 is a block diagram explaining this system.

A first physical path S1 is set between an external port #1 of a first CHA controller 21-1 among a plurality of CHAs of the first storage subsystem 2, and a switch SW. Similarly, second, third and fourth physical paths S2, S3 and S4 are formed between the external port of the second, third and fourth CHA controllers and the switch SW. The external port supports the issuance of commands.

Meanwhile, a fifth physical path T1 is also formed between the first target port 41A of the second storage subsystem 40 and the switch. Similarly, sixth, seventh and eighth physical paths T2, T3 and T4 are formed between the second, third and fourth target ports 41B, 41C, 41D and the switch SW. A target port is a port for receiving commands issued from the external port.

The second storage subsystem 40 comprises a logical volume (LDEV) as the foregoing external volume to which the physical storage area of the memory device is allocated. The logical volume (LDEV) is mapped with a plurality of logical units (LU), and each logical unit is differentiated by a logical unit number (LUN).

The memory of the second storage subsystem is registered with control information for mapping a logical unit LUN1 to the target port 41A, mapping a logical unit LUN2 to the target port 41B, mapping a logical unit LUN3 to the target port 41C, and mapping a logical unit LUN4 to the target port 41D.

The memory of the second storage subsystem additionally stores control information for mapping a plurality of logical units (LUN1-4) to the logical volume (LDEV).

Moreover, in the control table registered in the memory of the second storage subsystem, a logical path PA1 between the logical unit (LUN1) and the logical volume (LDEV), and a logical path PA2 between the logical unit (LUN2) and the logical volume (LDEV) are respectively registered as active paths.

Meanwhile, a logical path PA3 between the logical unit LUN3 and the logical volume (LDEV), and a logical path PA4 between the logical unit LUN4 and the logical volume (LDEV) are respectively registered as passive paths.

Here, the active paths PA1, PA2 are paths for passing the access (I/O) from the external port of the CHA of the first storage subsystem 20 through to the logical volume (LDEV) via the target port of the second storage subsystem and the logical unit, whereas the passive paths PA3, PA4 are paths that do not contribute to the I/O transfer.

A passive path is an alternate path of the active path and, when a path leading to the active path is subject to an inconvenience such as being blocked due to a failure, the I/O control right is delegated from the active path, and the passive path executes the I/O transfer until the active path is recovered.

Whether the logical path to the logical volume (LDEV) is active or passive is set by the management apparatus in the shared memory of the second storage subsystem. The controller of the second storage subsystem controls the logical path between the logical unit LUN and the logical volume (LDEV) based on the control table of the shared memory.

This function of the controller of the second storage subsystem 40 is achieved, for instance, with the CHA comprising a target port. When a failure occurs in the active path, the controller performs processing for transferring the I/O control right from the active path to the passive path based on a management program.

With the system shown in FIG. 2, a total of 8 paths can be set as the logical paths that lead the I/O issued from the first storage subsystem to the logical volume (LDEV) as described below.

In other words, the 8 logical paths are physical path S1-physical path T1-LUN1-PA1-(LDEV), physical path S1-physical path T2-LUN2-PA2-(LDEV), physical path S2-physical path T1-LUN1-PA1-(LDEV), physical path S2-physical path T2-LUN2-PA2-(LDEV), physical path S3-physical path T3-LUN3-PA3-(LDEV), physical path S3-physical path T4-LUN4-PA4-(LDEV), physical path S4-physical path T3-LUN3-PA3-(LDEV), and physical path S4-physical path T4-LUN4-PA4-(LDEV).

The management apparatus 23 of the first storage subsystem sets a logical path from the first storage subsystem to the external volume of the second storage subsystem to a prescribed logical path among the 8 logical paths.

The definition of a logical path is registered in the control table Tm of the shared memory 25. FIG. 3 shows a detailed example of the control table Tm. The first storage subsystem 20 creates this table by acquiring necessary information from the second storage subsystem 40, and registers such table in the shared memory 25.

The VDEV# of this control table is a virtual device of the first storage system for mapping the external device of the second storage system to the internal volume of the first storage system.

"Valid path bitmap" corresponds to the setting status of the logical path from the first storage subsystem 20 to the logical volume (LDEV) of the second storage subsystem. The total number of bits of the valid path bitmap shows the number of paths that can be set as a logical path. With the system of FIG. 2, since a total of 8 paths can be set as the logical path as described above, the total number of bits is 8.

In addition, as described above, with the system of FIG. 2, since a total of 4 logical paths are set as the logical path to the external volume (LDEV), a flag of "1" is set to the 4 bits.

"External-side path mode" shows the control method of the path to the external volume (LDEV) of the second storage subsystem. With the system of FIG. 2, since a plurality of logical paths to the external volume is controlled based on the status of the I/O control right, AP (active path/passive path) is registered here.

As the control method of a logical path to the external volume, in addition to the above, there are the foregoing single path mode and the multi-path mode.

"Setting path mode" is the control method when the first storage subsystem issues an I/O to the external volume (LDEV) of the second storage subsystem, and there is a single path mode, a pulse path mode, or an APLB (Active Passive Load Balancing) mode.

Here, a single path mode is a mode for the first storage subsystem 20 to issue an I/O to one of the logical paths among the 8 paths, a multi-path mode is a mode for the first storage subsystem to issue an I/O while balancing the load in all logical paths, and an APLB is a mode for issuing an I/O to a plurality of active paths (PA1 and PA2) in round robin. The first storage subsystem detects that an active path/passive path is set to the logical path to the external volume of the second storage subsystem, and sets APLB in the control table.

"Device identifying information" is information for identifying the memory device configuring the VDEV#. The capacity is the total storage capacity of the VDEV, and the device type shows the type of device (disk or tape, etc.).

"Externally connected path information unit" in the control table explains the definition contents of the logical path from the first storage subsystem to the external volume (LDEV), and the path# is an entry of the logical path. "External port#" is an entry of the external port corresponding to the logical path. "WWN" is the World Wide Name for identifying the external port. "LUN" is the logical unit mapped to the external port.

"External-side NP" is the setting in the second storage subsystem for distinguishing whether the logical path corresponds to an active path or a passive path. The setting NP is the setting in the first storage subsystem. If the first storage subsystem adopts the foregoing APLB mode, the first storage subsystem decides active or passive in accordance with the setting of the external A/P.

"Status" is the status of the logical path. "Normal" shows that the logical path is normal, and shows that the transfer of the I/O is normal. "Passive" shows that the I/O is not being transferred, but the logical path is of a normal status.

If "Active" is set as the logical path as described above, this logical path possess the right (I/O control right) for transferring the I/O. A logical path set as "Passive" does not possess the I/O control right, but if a failure occurs to the active path, the I/O control right will be transferred thereto. "Priority" shows the priority in the single path mode.

In the control table of FIG. 3, 4 logical paths of P1-P4 are set as the logical paths. The logical path P1 is a path where the I/O reaches the external volume (LDEV) by sequentially passing through the external port 21-1 (#1), the physical path S1, the physical path T1, the target port 41A (WWN=A), the logical unit (LUN1), and the active path PA1.

The logical path P2 is a path where the I/O reaches the external volume (LDEV) by sequentially passing through the external port 21-2 (#2), the physical path S2, the physical path T2, the target port 41B (WWN=A'), the logical unit (LUN2), and the active path PA2.

The logical path P3 is a path where the I/O reaches the external volume (LDEV) by sequentially passing through the external port 21-3 (#3), the physical path S3, the physical path T3, the target port 41C (WWN=B), the logical unit (LUN3), and the passive path PA3.

The logical path P4 is a path where the I/O reaches the external volume (LDEV) by sequentially passing through the external port 21-4 (#4), the physical path S4, the physical path T4, the target port 41D (WWN=B'), the logical unit (LUN4), and the passive path PA4. These plurality of logical paths are, as shown in FIG. 3, mutually distinguished based on the external port number, the target port WWN, and the logical unit number (LUN). These items are registered by the user making input via the management apparatus 23.

To explain the operation of the embodiment illustrated in FIG. 2 with reference to FIG. 3, the first storage subsystem 40 refers to the definition of the logical paths P1 and P2 of the control table shown in FIG. 3, and simultaneously transfers the I/O to these logical paths.

Here, the I/O is simultaneously issued from the external port 21-1 to the physical path S1, and from the external port 21-2 to the physical path S2 as shown with the curve of reference numeral 100.

The switch refers to the command and transfers the I/O along the route shown in FIG. 3. In other words, the 110 from the external ports 21-1, 21-2 of the first storage subsystem output with the multi-path mode is transferred to the external volume (LDEV) by sequentially passing through the external port 21-1, the physical path S1, the physical path T1, the target port 41A, the logical unit (LUN1), and the active path PA1. Meanwhile, the I/O is transferred to the external volume (LDEV) by passing through the external port 21-2, the physical path S2, the physical path T2, the target port 41B, the logical unit (LUN2), and the active path PA2.

In FIG. 3, since both the logical path P1 and the logical path P2 are defined as the active path, the I/O control right will not be switched even if the I/O is simultaneously sent to these paths. Like this, since the first storage subsystem is able to transfer the I/O to a plurality of logical paths set to active leading to the external volume in a multi-path mode, it is possible to improve the response to the transfer of the I/O of the second storage subsystem.

Incidentally, since the logical paths PA3 and PA4 are defined as passive paths, an I/O is not issued to the passive paths before the active logical path is blocked.

Figure 4:
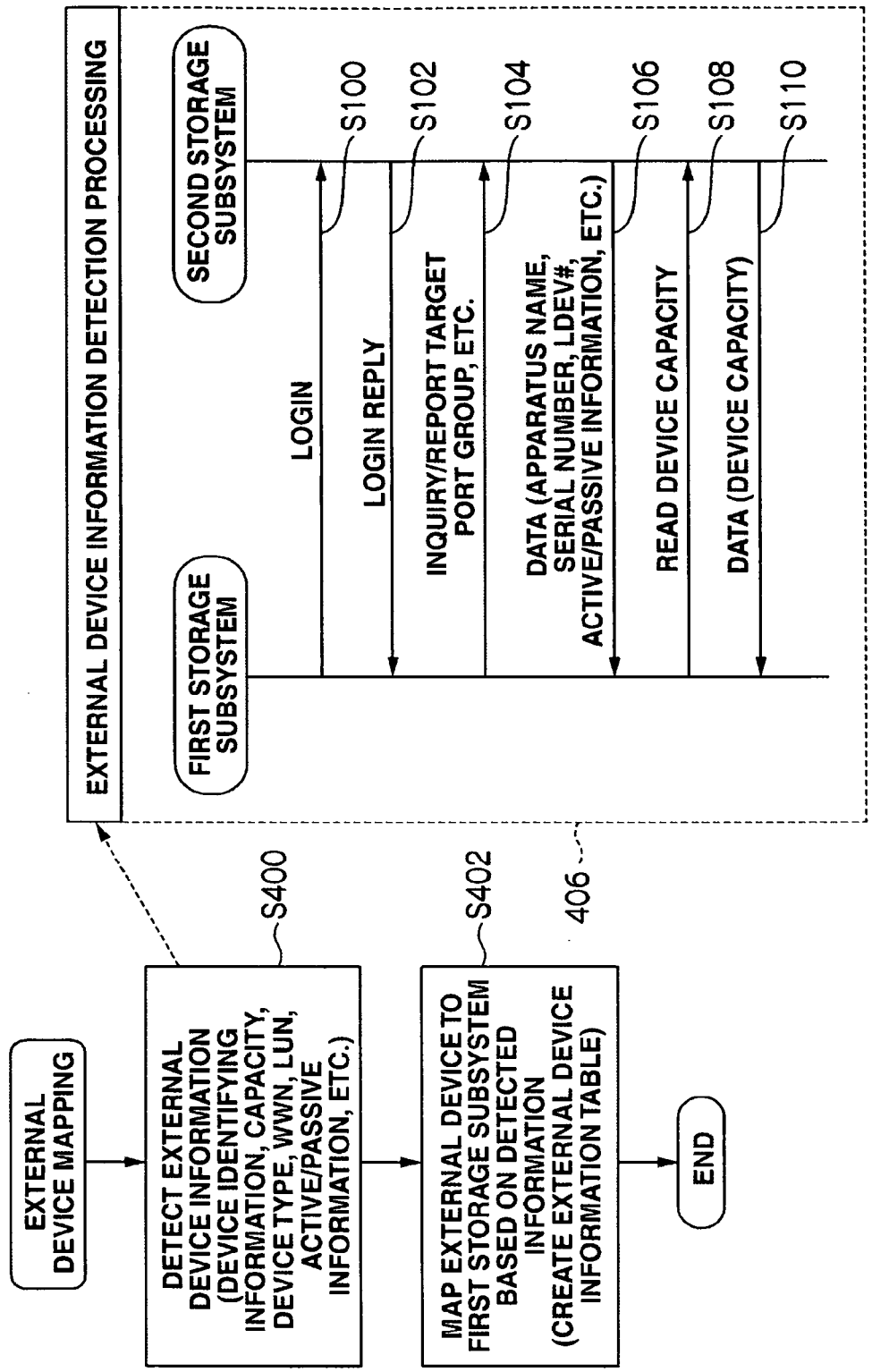
FIG. 4 is a flowchart explaining the routine for the first storage subsystem to obtain information from the second storage subsystem and creating the management table of FIG. 3.

FIG. 4 is a flowchart showing the relevant parts of the processing for creating the control table of FIG. 3 during the process of mapping the memory device of the external storage subsystem 40 to the virtual volume of the first storage subsystem 20. The processing of S400 is explained in detail according to the time chart 406.

At S400, the first storage subsystem acquires various types of information from the second storage subsystem. In other words, the first storage subsystem 20 logs into the second storage subsystem 40 from the external port (21A) of the channel adapter 21 via the switch circuit SW (S100).

The login is completed when the second storage subsystem 40 returns a reply to the login of the first storage subsystem 20 (S102).

Subsequently, the first storage subsystem 20 sends an inquiry command defined with a SCSI (Small Computer System Interface) standard is sent to the second storage subsystem (S104), and acquires detailed information (apparatus name, serial number, (LDEV)#, "Active"/"Passive" information) of the second storage subsystem 40 (S106).

The first storage subsystem thereafter makes an inquiry to the second storage subsystem regarding the capacity of the memory device (S108), and the second storage subsystem replies to this inquiry (S110).

At step S402, the CHA 21 of the first storage subsystem maps the storage area of the memory device of the second storage subsystem to its own volume based on the acquired information, registers specific information in the control table Tm of FIG. 3 during that process, and registers this control table in the shared memory 25.

The inquiry command is used for clarifying the type and configuration of the apparatus of the inquiree, and it is thereby possible to comprehend the physical structure by penetrating the hierarchy of the inquiree apparatus.

Failover processing in a case where a failure occurs in an active logical path is now explained. A failover is the processing of transferring the control right of the active path to the passive path.

Figure 5:
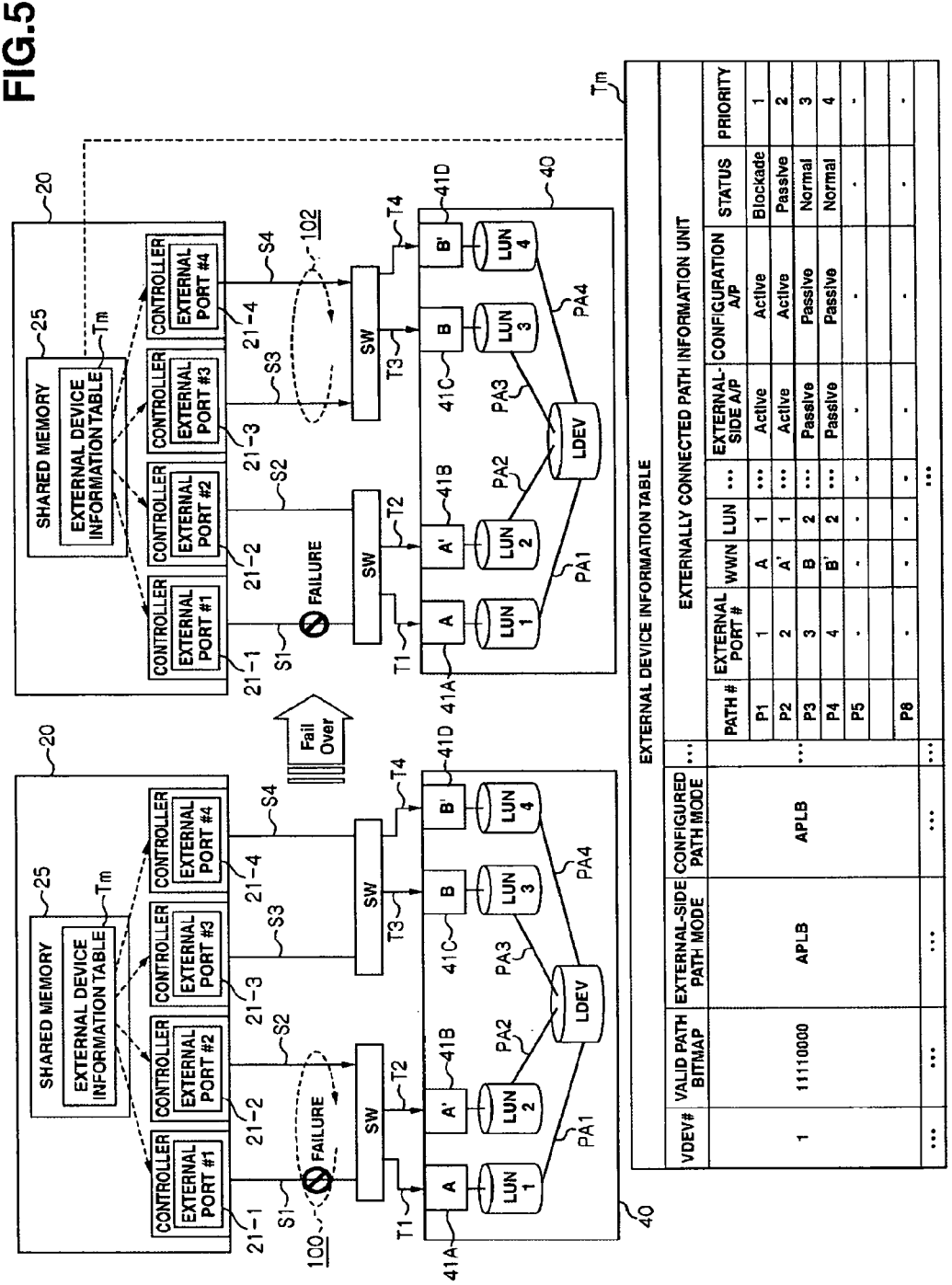
FIG. 5 is a block diagram of a storage system showing a situation of performing failover to a path with the I/O control right set to passive when a failure occurs in a path set to active.

FIG. 5 is a block diagram explaining the failover processing. Here, in the explanation of a failover, let it be assumed that the physical path S1 was subject to a failure and blocked.

When the CHA of the first storage subsystem 20 detects the blockade of the physical path S1 based on the failure detection program, it registers a failure status of "Blockade" to the status of the logical path P relating to the physical path blocked from the control table Tm.

If the logical path P1 is blocked, the only logical path that transfers the I/O to the external volume (LDEV) will be [the logical path] P2. In this status, since the redundancy will be lost in the I/O transfer, the failover control program stored in the local memory of the CHA transfers the I/O to the passive logical paths P3 and P4.

Thus, as shown in the control table Tm of FIG. 5, the controller of the CHA updates and registers the status of the logical path P2 from "Normal" to "Passive," and updates the status of the logical paths P3 and P4 from "Passive" to "Normal" based on the failover control program. As described above, "Blockade" is registered in the logical path P1.

The CHA simultaneously sends the I/O to a group 102 configured from the physical paths S3 and S4 in order to send the I/O to the logical paths P3, P4 delegated with the control right in round robin based on the I/O transfer control program.

Figure 6:
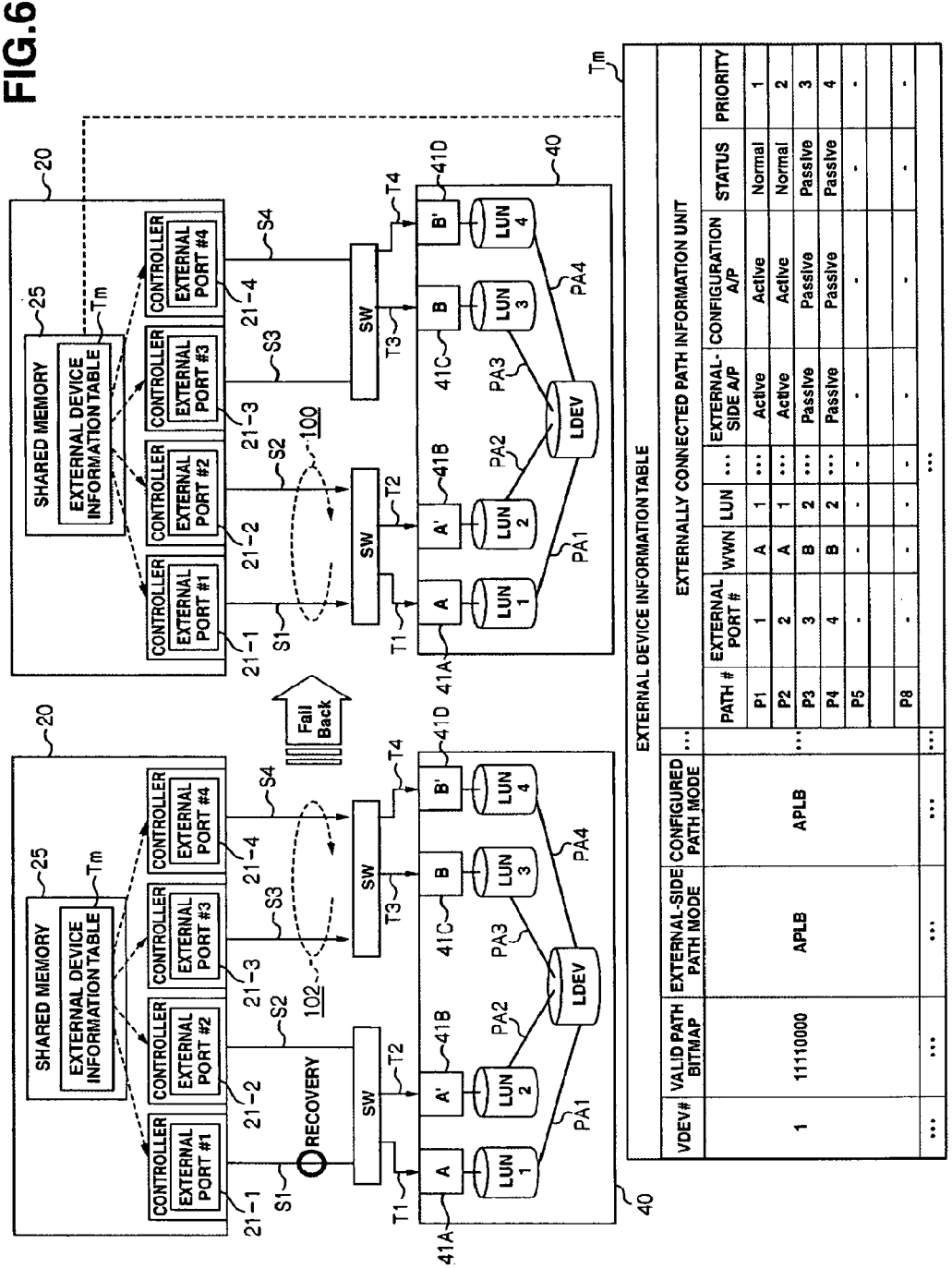
FIG. 6 is a block diagram of the storage system showing a situation of performing failback to a path with the I/O control right set to active.

FIG. 6 is a block diagram explaining the failback processing for returning the system after failover to a status before failover.

When the failure detection program of the CHA detects that the failure of the physical path S1 has been corrected, the failover control program returns the control table Tm from the status shown in FIG. 5 to the status before the failure occurred (Tm of FIG. 6).

In other words, the status of the logical path P2 is updated from "Passive" to "Normal," and the status of the logical paths P3 and P4 is updated from "Normal" to "Passive." Since the blockade of the physical path S1 has been released, the status of the logical path P1 is changed from "Blockade" to "Normal."

Accordingly, the I/O transfer control program refers to the control table updated to the foregoing status, determines that the I/O control right has been returned from the logical paths P3, P4 to the logical paths P1 and P2, and the I/O transfer from the first storage subsystem to the second storage subsystem is thereby resumed via the physical paths P1 and P2. The reason for performing the failback processing is to maintain the transfer order in the I/O transfer to the external volume via the active logical path.

Figure 7:
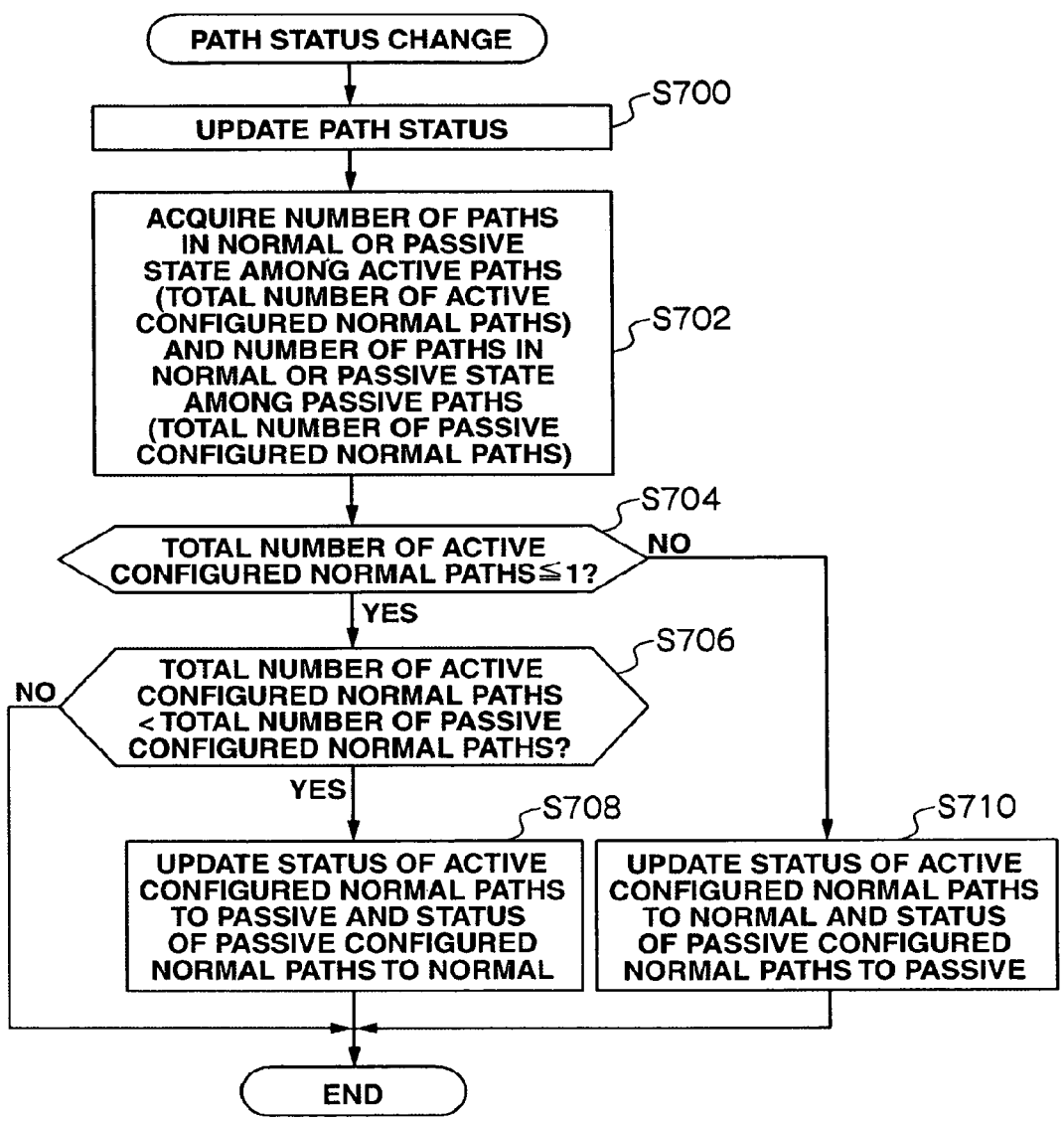
FIG. 7 is a flowchart controlling failover and failback.

FIG. 7 is a flowchart for controlling the failover and failback processing described above. This flowchart is executed by the first storage subsystem CHA based on the failover control program.

When the path status between the storage subsystems is changed due to a failure or maintenance as shown in FIG. 5 and FIG. 6, the CHA controller of the first storage subsystem determines whether it is necessary to perform failover or failback processing, and updates the logical path status of the control table.

As shown in FIG. 5 and FIG. 6, the controller, under the control of the failure detection program, updates the path status of the logical path affected by the occurrence of a failure or recovery from a failure among the logical path groups identified with the parameters (VDEV#, path#) of FIG. 3 (S700).

Subsequently, triggered by this update, the controller refers to the control table Tm and acquires the total number (total number of "Active" configured normal paths) of normal paths (paths not registered as "Blockade") in which the path status is set to "Normal" or "Passive" regarding the logical paths set as active paths among the logical path groups, and the total number (total number of "Passive" configured normal paths) of normal paths in which the path status is set to "Normal" or "Passive" regarding the logical paths set as passive paths among the logical path groups (S702).

Subsequently, in order to determine whether a failure has occurred in an active path, the controller determines whether the total number of "Active" configured normal paths is smaller than a given value (S704). If this given value is "1," as shown in FIG. 5, the controller is able to detect that a failure has occurred in the physical path S1.

If the controller obtains a positive result in the determination at S704, it compares the total number of "Active" configured normal paths and the total number of "Passive" configured normal paths (S706).

If the former is smaller than the latter, [the controller] determines that the I/O transfer in the APLB mode can be controlled even upon transferring the I/O control right to the passive path and proceeds to S708, and, as shown in the control table Tm of FIG. 5, updates the status of the "Active" configured normal path from "Normal" to "Passive" and updates the status of the "Passive" configured normal path from "Passive" to "Normal."

Meanwhile, if the controller obtains a negative result in the determination at S704, it determines that the update of the path status at S700 is the recovery from a failure and updates the status of the "Active" configured normal path from "Passive" to "Normal" and updates the status of the "Passive" configured normal path from "Normal" to "Passive" (S710).

If the controller obtains a negative result in the determination at S706, it determines that the failover processing cannot be performed since the number of passive paths is insufficient when a failure occurs in the active path, and ends the processing without performing the failover processing.

The flow from S700 to S708 corresponds to a failover and the flow from S700 to S710 corresponds to a failback. As described above, the path status of the control table is updated at S700, S706, and S708, respectively.

Although the foregoing embodiment explained a case where the first storage subsystem controlled the I/O transfer to the second storage subsystem based on the APLB mode, it may be preferable to control the data I/O with another mode depending on the type of data.

Depending on the I/O pattern from the host computer 10 to the first storage subsystem, a higher performance can be expected by the first storage subsystem issuing an I/O using a single path mode using one logical path instead of transferring the I/O to the plurality of logical paths with the APLB mode. For example, this would be a case where the I/O tendency from the host computer is a sequential access.

The configured path mode of the first storage subsystem can be suitably set or changed based on the I/O pattern from the host system. The recommended path mode when the I/O pattern from the host system is a sequential access is the single path mode, and the recommended path mode in the case of a random access is the multi-path mode or the APLB mode. The user refers to the recommended mode and sets or changes the path mode of the first storage subsystem 20.

Figure 8:
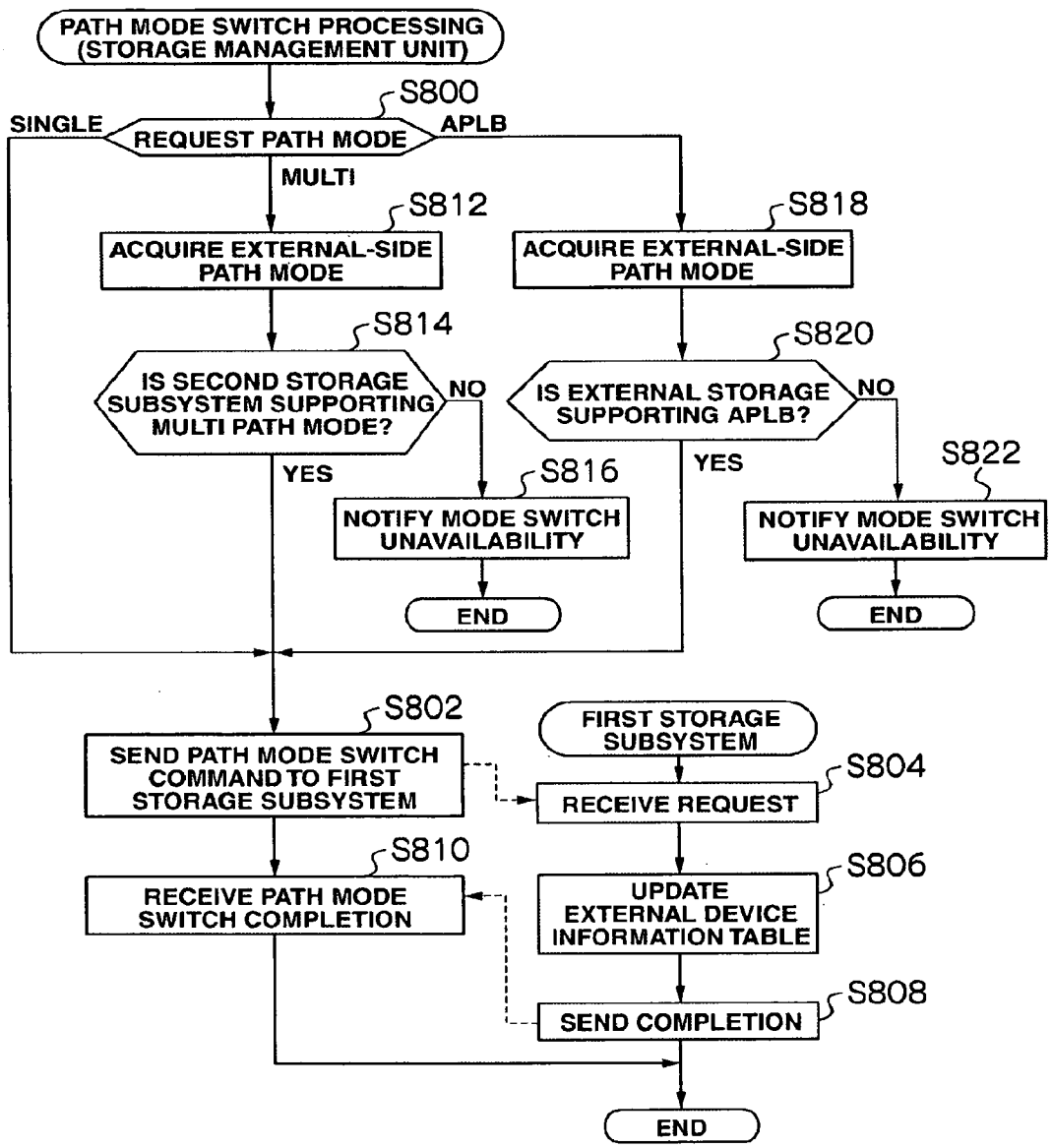
FIG. 8 is a flowchart for changing the I/O transfer mode based on the user setting via the management apparatus.

FIG. 8 shows a flowchart for setting or changing the I/O transfer mode to the first storage system based on the user setting made via the management program of the SVP 23 as the management unit of the storage subsystem.

The management program checks the mode requested by the user (S800). If the requested mode is a single mode, the management unit checks the configuration information of the shared memory 25, and, if the requested mode and the set mode are different, sends a path mode switch command to the first storage subsystem (S802).

When the first storage subsystem receives this request (S804), it registers the single path mode as the requested path mode in the configured path mode of the control table (FIG. 3) (S806). When this update is complete, the first storage subsystem notifies the management program to such effect, and the management program that received this notice ends the processing.

When the signal path mode is set as the configured path mode, the I/O transfer program of the first storage subsystem sends the I/O to one logical path among the plurality of logical paths. If a plurality of logical paths are set as active, the I/O is output to one logical path.

If the requested path mode is the multi-path mode at S800, the management program acquires information of the second storage subsystem from the control table recorded in the shared memory 25 (S812), it checks whether the second storage subsystem is supporting the multi-path mode (S814).

If the multi-path mode is not supported by the external device, the management program notifies the user that the path mode cannot be switched (S816). Meanwhile, if the multi-path mode is supported, the path mode is updated and stored as per the foregoing explanation.

The path status of the control table in the case of the multi-path mode is set to "Normal" for all logical paths.

Meanwhile, if the requested path mode is the APLB mode, the management program checks whether the second storage subsystem is supporting this mode, and, if this is denied, the management program notifies the processing to the user and ends the processing (S822). Meanwhile, if this is affirmed, the management program updates and stores the path mode as per the foregoing explanation.

Figure 9:
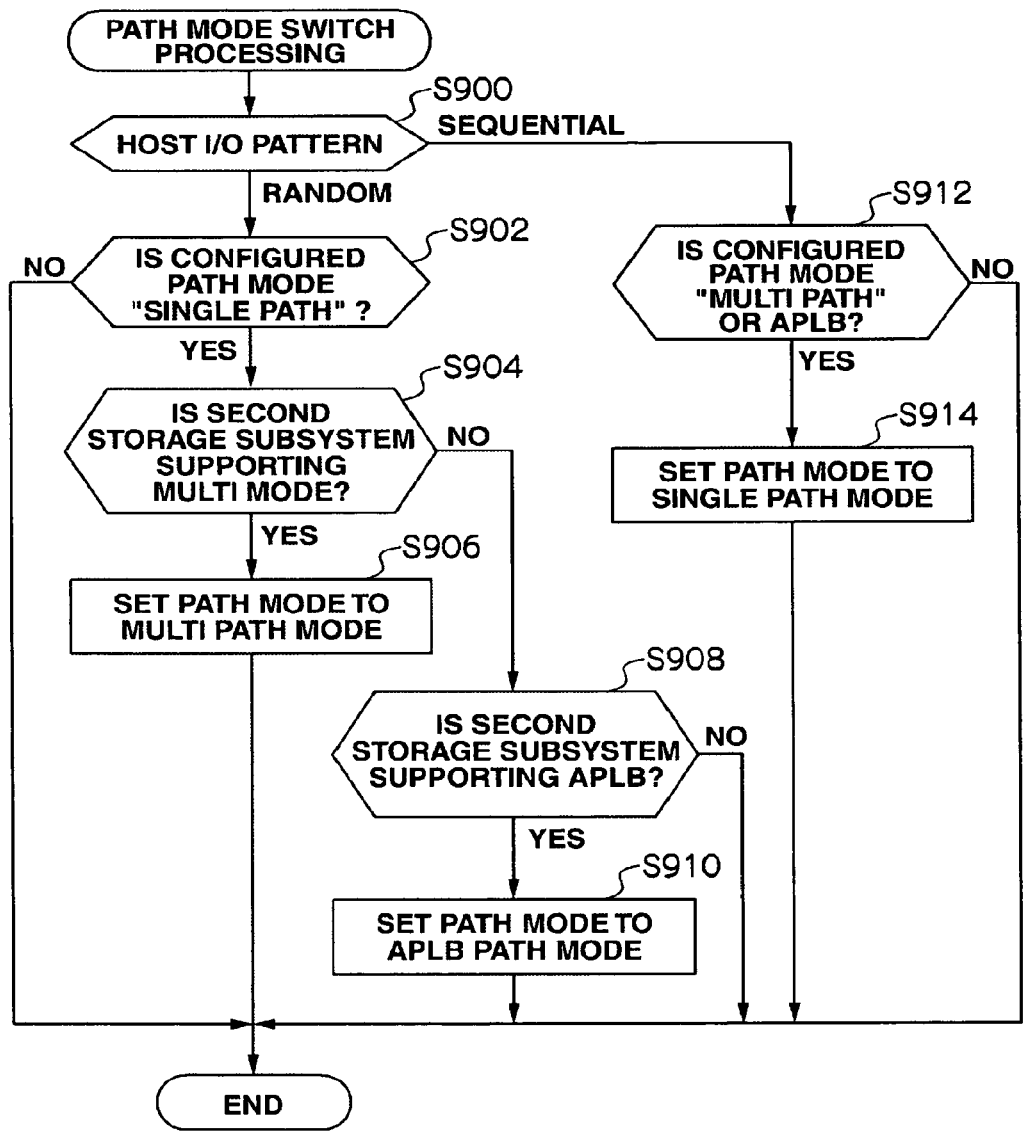
FIG. 9 is a flowchart for the first storage subsystem changing the I/O transfer mode based on the I/O pattern from the host system.

In comparison to FIG. 8, FIG. 9 is a flowchart for the I/O transfer program of the CHA of the first storage subsystem to detect the I/O pattern from the host system and set or change the path mode.

The management program stored in the local memory of the CHA checks the I/O pattern from the host system (S900) and, if this is a random access, checks whether the configured path mode of the control table is a single path mode (S902).

If the configured path mode is not a single path mode, the configured path mode is either the multi-path mode or the APLB mode, and is a mode that is suitable for the I/O transfer of random access. Thus, the CHA ends the processing.

If the configured path mode is a single path mode, the CHA 21 reads information of the second storage subsystem from the shared memory 25, and checks whether the second storage subsystem supports the multi-path mode (S904).

If the CHA determines control information indicating that the second storage subsystem is supporting this mode, the CHA changes the path mode of the control table from the single path mode to the multi-path mode (S906), and processing the random access from the host system in round robin that issues the I/O to a plurality of logical paths.

Meanwhile, if the second storage subsystem is not supporting the multi-path mode, the CHA checks whether the second storage subsystem is supporting the active path/passive path (S908). If this is affirmed, the CHA sets the path mode of the control table to APLB (S910), and if this is denied, the random access from the host system cannot be transferred to the plurality of logical paths, and therefore processes the host I/O in the single path mode of transferring the I/O to one logical path.

If the I/O pattern from the host system is a sequential access, the CHA determines whether the path mode set in the control table is the multi-path mode or the APLB mode (S912). If this is affirmed, the CHA changes the path mode to a single path mode.

If the CHA obtains a negative result in this determination, it ends the processing since it deems that the configured path mode is the single path mode that is suitable for sequential access.

Based on the processing method shown in FIG. 8 and FIG. 9, the optimal method of issuing the I/O to the logical path can be realized in the I/O transfer from the first storage subsystem to the external volume of the second storage subsystem. Moreover, based on the processing method shown in FIG. 9, the method of issuing the I/O to the logical path can be dynamically set to the optimal pattern for the I/O pattern issued from the host system to the first storage subsystem.

Figure 10:
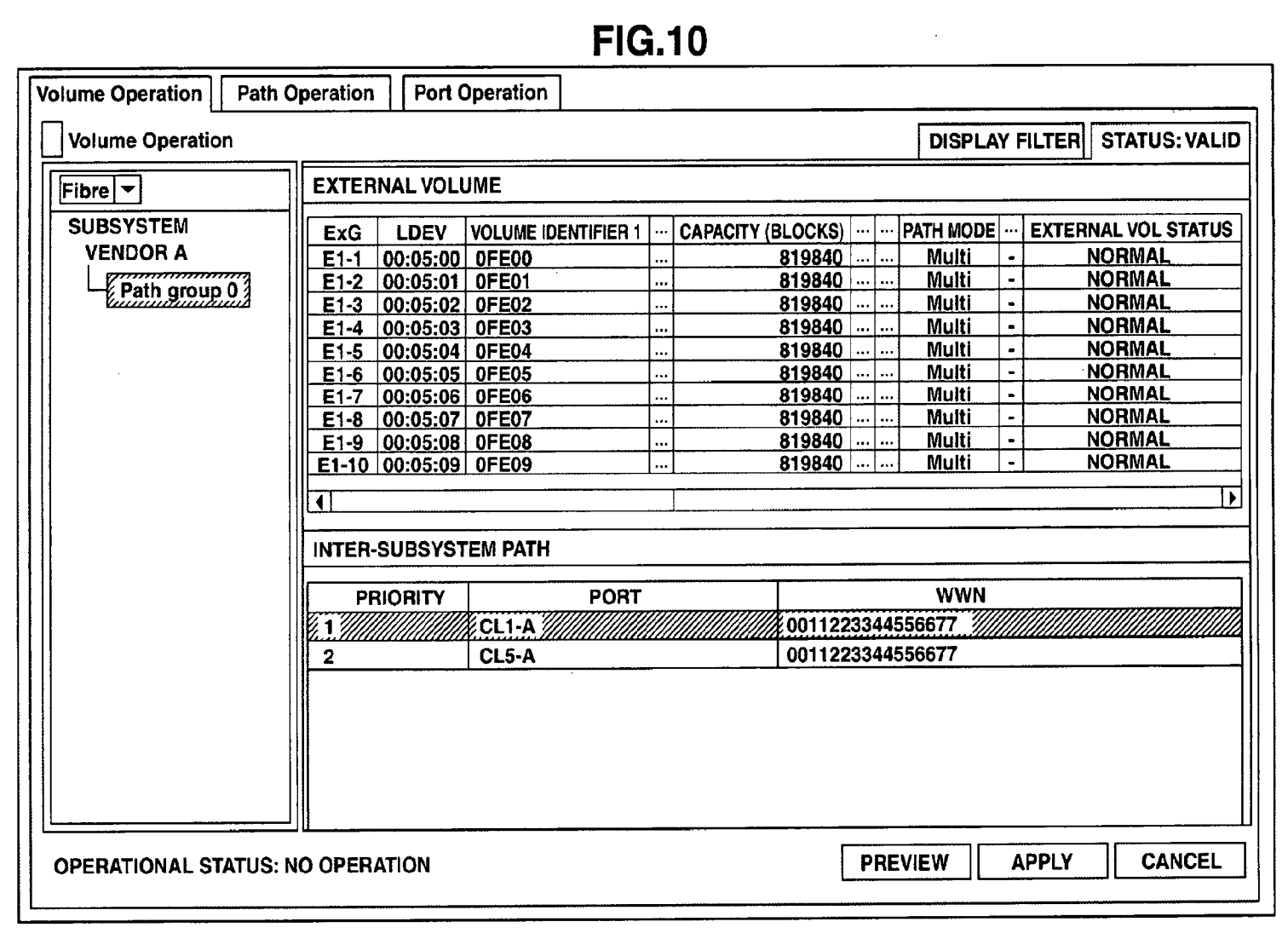

FIG. 10 shows a management screen for setting the path between the first storage system 20 and the second storage subsystem 40, and this is provided from the management terminal 23 to the user. This path is defined based on the identification number (CL1-A, CL5-A) of the external port and the WWN of the target port.

The management screen shows the external volume, the gist thereof, the path usage mode, and the volume status.

FIG. 11 is a management screen showing further detailed information, and, in addition to the information of FIG. 10, displays the logical unit number (LUN) of the second storage subsystem and the status of the path status table corresponding to the path between the storage subsystems.

What is claimed is:

1. A storage system, comprising:
 a first storage subsystem having a first logical volume to be accessed by a host computer; and
 a second storage subsystem connected to the first storage subsystem and having a second logical volume to be mapped to the first logical volume;
 wherein the first storage subsystem includes:
 a memory having definition information for defining a plurality of logical paths between the first logical volume and the second logical volume through which I/O from the host computer to the first logical volume is transferred, and a transfer mode of the I/O through the plurality of logical paths; and
 a controller for controlling the transfer of the I/O based on the definition information,
 wherein if the transfer mode is changed to a single path mode in which the I/O is transferred using one of the plurality of logical paths, the controller registers the single path mode as the transfer mode in the definition information,
 wherein if the transfer mode is changed to a multi path mode in which the I/O is transferred using the plurality of logical paths for balancing I/O load, the controller checks whether the second storage subsystem supports the multi path mode and registers the multi path mode as the transfer mode in the definition information in the case that the second storage subsystem supports the multi path mode or notifies that the plurality of logical paths is not switched to the multi path mode in the case that the second storage subsystem does not support the multi path mode, wherein the controller detects an I/O pattern of the I/O if the controller receives the I/O, wherein if the detected I/O pattern of the I/O is a sequential access, the controller switches the transfer mode, from the multi path mode to the single path mode, and wherein if the detected I/O pattern of the I/O is a random access, the controller checks whether the second storage subsystem supports the multi path mode or not, switches the transfer mode from the single path mode to the multi path mode in the case that the second storage subsystem supports the multi path mode.

2. The storage system according to claim 1, wherein if the transfer mode is changed to a round-robin mode in which the I/O is transferred using two or more logical paths in the plurality of logical paths for balancing I/O load in round robin, the controller checks whether the second storage subsystem supports the round-robin mode and register the round-robin mode as the transfer mode in the definition information in the case that the second storage subsystem supports the round-robin mode.

3. The storage system according to claim 1, wherein the controller switches the transfer mode from the single path mode to the round-robin mode in the case that the second storage subsystem does not support the multi path mode.

4. The storage system according to claim 1, wherein two or more logical paths among the plurality of logical paths are defined as active paths to transfer the I/O, and the controller transfers the I/O to the active paths.

5. The storage system according to claim 4, wherein two or more logical paths among the plurality of logical paths are defined as passive paths, and the controller transfers the I/O to the passive path if one of the active paths is failed.

6. The storage system according to claim 5, wherein, when the controller determines that at least one of the plurality of logical paths defined as active path has recovered from a failure, the controller returns the authority of transferring the I/O from the logical path defined as a passive path to the logical path defined as active path.

7. A control method of a storage system in which a second storage subsystem is connected, the method comprising:

managing definition information for defining a plurality of logical paths between a first logical volume and a second logical volume through which I/O from a host computer to the first logical volume is transferred, and a transfer mode of the I/O through the plurality of logical paths;

registering a single path mode as the transfer mode in the definition information if the transfer mode is changed to a single path mode in which the I/O is transferred using one of the plurality of logical paths;

checking whether the second storage subsystem supports the multi path mode if the transfer mode is changed to a multi path mode in which the I/O is transferred using the plurality of logical paths for balancing I/O load;

registering a multi path mode as the transfer mode in the definition information in the case that the second storage subsystem supports the multi path mode or notifying that the plurality of logical paths is not switched to the multi path mode in the case that the second storage subsystem does not support the multi path mode;

detecting an I/O pattern of the I/O if a controller receives the I/O; and wherein if the detected I/O pattern of the I/O is a sequential access, the controller switches the transfer mode, from the multi path mode to the single path mode, and wherein if the detected I/O pattern of the I/O is a random access, the controller checks whether the second storage subsystem supports the multi path mode or not, switches the transfer mode from the single path mode to the multi path mode in the case that the second storage subsystem supports the multi path mode.

8. The control method of the storage system according to claim 7, further comprising:

checking whether the second storage subsystem supports the round-robin mode if the transfer mode is changed to a round-robin mode in which the I/O is transferred using two or more logical paths in the plurality of logical paths for balancing I/O load in round robin; and registering the round-robin mode as the transfer mode in the definition information in the case that the second storage subsystem supports the round-robin mode.

9. The control method of the storage system according to claim 7, further comprising:

switching the transfer mode from the single path mode to the round-robin mode in the case that the second storage subsystem does not support the multi path mode.

10. The control method of the storage system according to claim 7, wherein two or more logical paths among the plurality of logical paths are defined as active paths to transfer the I/O, and the controller transfers the I/O to the active paths.

11. The control method of the storage system according to claim 10, wherein two or more logical paths among the plurality of logical paths are defined as passive paths, and the controller transfers the I/O to the passive path if one of the active paths is failed.

12. The control method of the storage system according to claim 11, wherein, when the controller determines that at least one of the plurality of logical paths defined as active path has recovered from a failure, the controller returns the authority of transferring the I/O from the logical path defined as a passive path to the logical path defined as active path.

* * * * *